United States Patent
Lin

(10) Patent No.: US 7,436,380 B2
(45) Date of Patent: Oct. 14, 2008

(54) ELECTRONIC APPARATUS WITH LEVEL DETECTING FUNCTION

(75) Inventor: Jui-Chiang Lin, Taipei (TW)

(73) Assignee: Lite-On It Corporation, Hsinchu (TW)

( * ) Notice: Subject to any disclaimer, the term of this patent is extended or adjusted under 35 U.S.C. 154(b) by 666 days.

(21) Appl. No.: 10/710,668

(22) Filed: Jul. 28, 2004

(65) Prior Publication Data

US 2005/0199789 A1    Sep. 15, 2005

(30) Foreign Application Priority Data

Mar. 9, 2004   (TW) .............................. 93203553 U

(51) Int. Cl.
  *G09G 5/00*   (2006.01)
  *G11B 7/00*   (2006.01)

(52) U.S. Cl. ...................... 345/87; 369/53.2; 369/44.25; 369/53.19; 250/231.1; 250/231.13; 720/695

(58) Field of Classification Search .................. 345/102, 345/87, 204; 369/44.32, 44.23, 46, 100, 369/58, 112, 44.25, 53.2, 53.19; 250/231.1, 250/231.13; 720/673, 637, 695
See application file for complete search history.

(56) References Cited

U.S. PATENT DOCUMENTS

| | | | | |
|---|---|---|---|---|
| 4,000,906 A | * | 1/1977 | Kolosko et al. | ............. 369/239 |
| 4,634,853 A | * | 1/1987 | Kanamaru | ............... 369/44.25 |
| 5,216,649 A | | 6/1993 | Koike et al. | |
| 5,442,615 A | * | 8/1995 | Ohsato et al. | ............ 369/44.32 |
| 5,815,293 A | | 9/1998 | Komma et al. | |
| 5,859,818 A | * | 1/1999 | Tateishi et al. | ........... 369/44.32 |
| 5,970,035 A | * | 10/1999 | Ohmori et al. | ............ 369/53.2 |
| 6,160,774 A | | 12/2000 | Gage et al. | |
| 2004/0251406 A1 | * | 12/2004 | Figueria | ................. 250/231.1 |

* cited by examiner

*Primary Examiner*—Kevin M. Nguyen
(74) *Attorney, Agent, or Firm*—Winston Hsu

(57) ABSTRACT

An electronic apparatus with level detecting capability has an electronic component, a light-sensing device for sensing light, a light source for emitting light onto the light-sensing device, a light blocker for blocking light emitted by the light source from projecting onto the light-sensing device when the electronic component is tilted and has a tilt angle within a predetermined range, and a control circuit electrically connected to the light-sensing device for controlling the electronic component to selectively operate in one of a plurality of operating modes according to the intensity of light received by the light-sensing device.

6 Claims, 7 Drawing Sheets

ELECTRONIC APPARATUS WITH LEVEL DETECTING FUNCTION

BACKGROUND OF INVENTION

1. Field of the Invention

The present invention relates to an electronic apparatus, and more particularly, to an electronic apparatus with level-detecting function.

2. Description of the Prior Art

In recent years, due to the explosive development of digital technology, analog data such as audio and video data are usually transformed into digital form for further storing and processing. Instead of conventional data storage media with relatively limited data storage capacity, optical discs, which have increased data storage capacity, are becoming one of the most popular data storage media. An optical disc drive is an electronic component used to read data of a disc.

In general, an optical disc drive cannot read data from an optical disc correctly unless the drive is properly disposed. If an optical disc drive is not properly disposed, by for example being upside down, and such a drive reads data from a disc continuously, data that the drive reads probably contains errors. Moreover, upside down use of an optical disc drive may result in a disc getting stuck and damaging a pickup head of the optical disc drive, which can be quite expensive to replace.

SUMMARY OF INVENTION

It is therefore a primary objective of the claimed invention to provide an electronic apparatus with level-detecting function to solve the above-mentioned problem.

According to the claimed invention, the electronic apparatus has an electronic component, a light-sensing device for sensing light, a light source for emitting light onto the light-sensing device, a light blocker for blocking light emitted by the light source from projecting onto the light-sensing device when the electronic component is tilted at an angle within a predetermined range, and a control circuit electrically connected to the light-sensing device for controlling the electronic component to selectively operate in one of a plurality of operating modes according to the intensity of light received by the light-sensing device.

According to the preferred embodiment, the electronic component can be an optical disc drive or a liquid crystal display panel (hereinafter as a LCD panel) capable of operated selectively in a vertical displaying mode or a horizontal displaying mode. Usually a horizontal displaying mode of a LCD panel means the LCD panel utilizes more pixels for displaying in the horizontal axis than in the vertical axis, while a vertical displaying mode of a LCD panel means the LCD panel utilizes more pixels for displaying in the vertical axis than in the horizontal axis. When the electronic component is an optical disc drive, the control circuit controls the optical disc drive to operate in an enable mode or an off mode according to whether the light-sensing device senses the light emitted by the light source. When the electronic component is an LCD panel, the control circuit controls the LCD panel to operate in a horizontal displaying mode or a vertical displaying mode according to whether the light-sensing device senses the light emitted by the light source.

It is an advantage of the claimed invention that an electronic apparatus has a level-detecting function. When the electronic component is tilted at an angle beyond the predetermined range, the control circuit can change the operating mode of the electronic component correspondingly. For example, the control circuit turns off the optical disc drive or controls the LCD panel to switch into another displaying mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
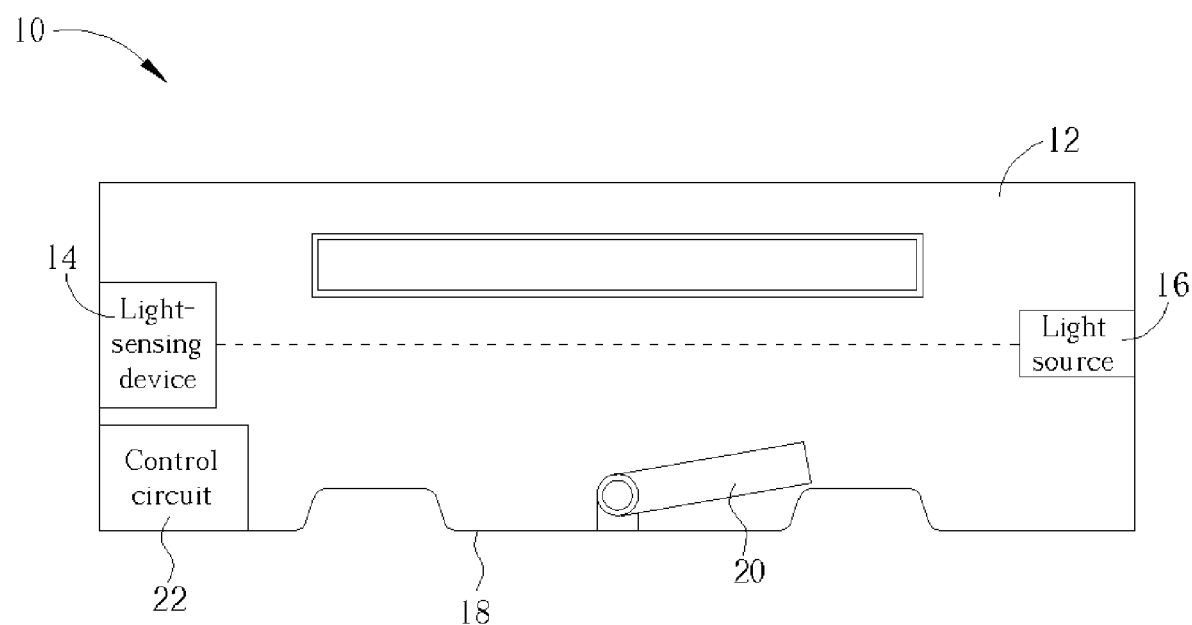
FIG. 1 is a front view of a flatly disposed electronic apparatus of the preferred embodiment according to the present invention.

Please refer to FIG. 1, which is a front view of a flatly disposed electronic apparatus 10 of the preferred embodiment according to the present invention. The electronic apparatus 10 has a level-detecting function. The electronic apparatus 10 comprises an optical disc drive 12, a light-sensing device 14 for sensing light, a light source 16 for projecting light onto the light-sensing device 14, a housing 18, a light blocker 20 rotatably fixed to the housing 18 and rotating with the rotation of the optical disc drive 12. Thus the light blocker 20 is able to block the light emitted by the light source 16 from projecting onto the light-sensing device 14 when the optical disc drive 12 is tilted and has a tile angle within a predetermined range. Moreover, a control circuit 22 electrically connected to the light-sensing device 14 for controlling the operation of the optical disc drive 12 according to the intensity of light received by the light-sensing device 14. The light blocker 20 is always pulled downward due to gravity and is capable of preventing the light-sensing device 14 from receiving part of or even all the light emitted by the light source 16 while the optical disc drive 12 is tilted.

Figure 2:
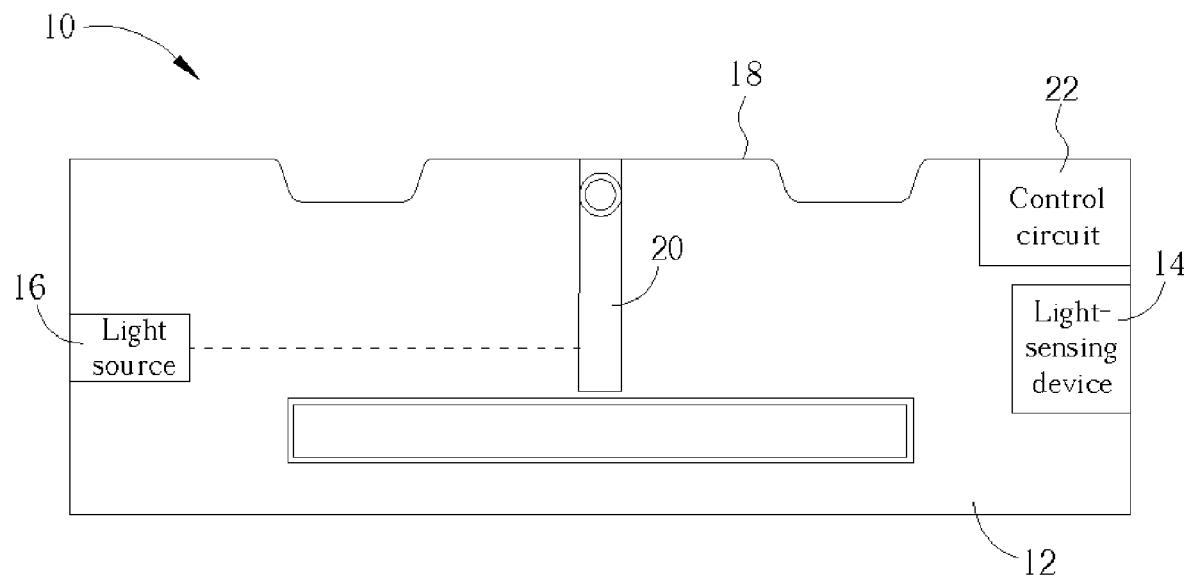
FIG. 2 is a front view of the electronic apparatus shown in FIG. 1 and turned upside down according to the present invention.

The operation of the electronic apparatus is described as follows: Since the optical disc drive 12 shown in FIG. 1 is flatly disposed in an upright position, the light blocker 20 leans against a bottom surface of the housing 18. The light blocker 20 at this moment is not located at a blocking position (for example, as shown in FIG. 2), where the light blocker 20 would block light emitted by the light source 16 (as a dashed line shown in FIG. 1) preventing the light-sensing device 14 from receiving light. In result, the light-sensing device 14 senses the light emitted from the light source 16 and the control circuit 22 controls the optical disc drive 12 accordingly. For example, if the optical disc drive 12 is reading a disc, the control circuit 22 then controls the optical disc drive 12 to operate in an enable mode and to read the disc continuously.

Please refer to FIG. 2, which is a front view of the electronic apparatus 10 turned upside down according to the present invention. The light blocker 20 is located at the blocking position according to the upside down disposed optical disc drive 12. The light-sensing device 14 at this moment cannot receive any light emitted by the light source 16 and the control circuit 22 controls the optical disc drive 12 accordingly. For example, if the optical disc drive 12 is reading a disc, the control circuit 22 then controls the optical disc drive 12 to operate in an off mode instead and to generate a sound signal or a light signal as an alarm signal, to stop reading the disc, or to be turned the optical disc drive 12 off.

Figure 3:
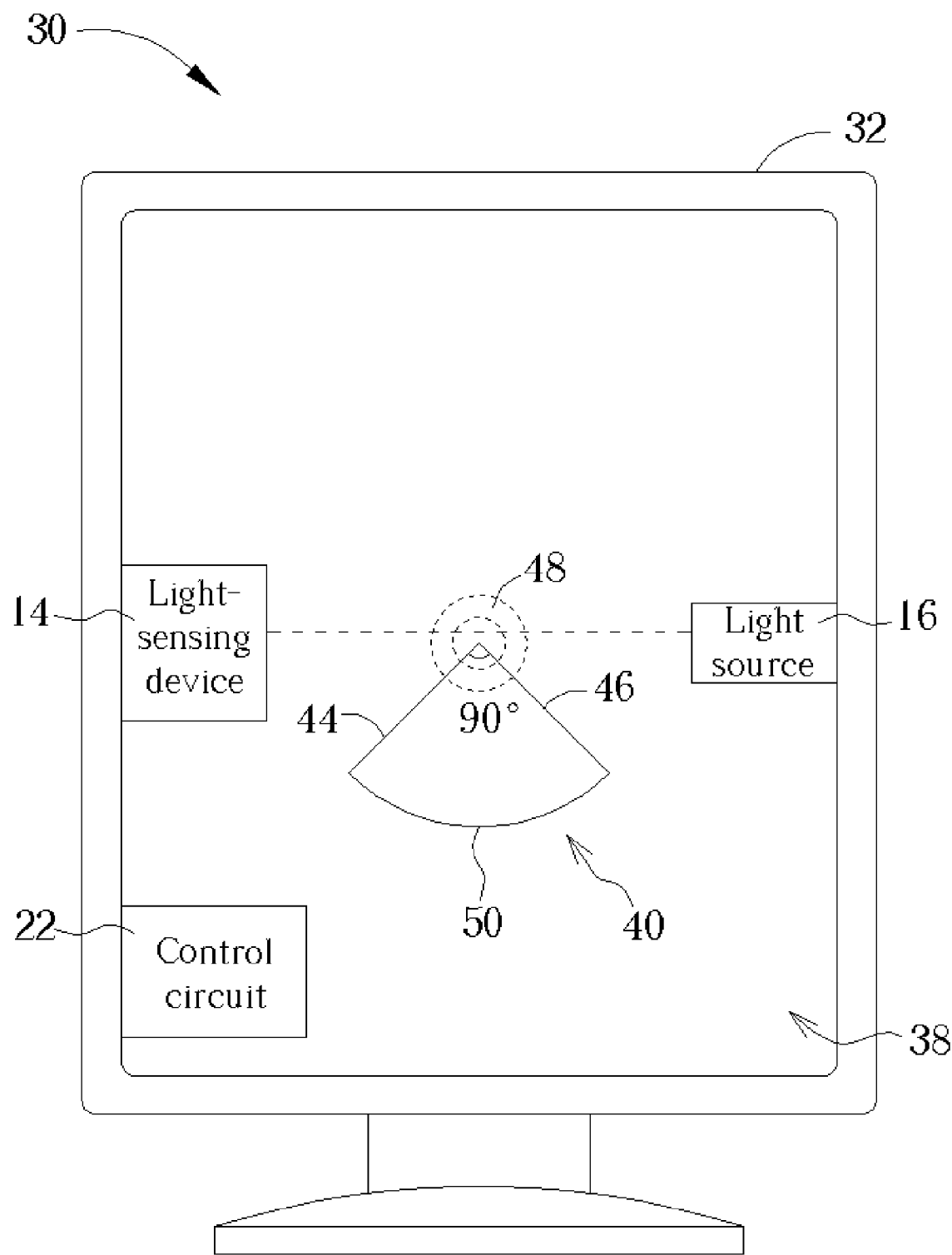
FIG. 3 is a front view of a flatly disposed electronic apparatus of a second embodiment according to the present invention.

Please refer to FIG. 3, which is a front view of a flatly disposed electronic apparatus 30 of a second embodiment according to the present invention. The electronic apparatus 30 also has the level-detecting function. The electronic apparatus 30 comprises a liquid crystal display panel (LCD panel) 32 capable of operated selectively in a vertical displaying mode or a horizontal displaying mode. As previously mentioned, usually a horizontal displaying mode of a LCD panel means the LCD panel utilizes more pixels for displaying in the horizontal axis than in the vertical axis, while a vertical displaying mode of a LCD panel means the LCD panel utilizes more pixels for displaying in the vertical axis than in the horizontal axis. The electronic apparatus 30 also comprises the light-sensing device 14, the light source 16, a housing 38, a light blocker 40, and the control circuit 22. The light blocker 40 comprises a rotation axis 48 rotatably fixed to the housing 38 and a light blocking body 50 fixed to the rotation axis 48 for rotating around the rotation axis 48 according to the rotation of the LCD panel 32. The light blocking body 50 comprises a first lateral side 44 and a second lateral side 46. The first lateral side 44 and the second lateral side 46 have an included angle of 90 degrees. The light blocker 50 is always downward directed due to gravity and is capable of preventing the light-sensing device 14 from receiving part of or even all the light emitted by the light source 16 while the LCD 32 is tilted.

The operation of the electronic apparatus 30 is described as follows: Since the light blocking body 50 of the light blocker 40 is directing downward due to gravity and is not located at the blocking position, the light-sensing device 14 at this moment will not receive any light and the control circuit 22 controls the LCD panel 32 accordingly. For example, the control circuit 22 controls the LCD panel 32 to operate in a vertical displaying mode or reports to a host that the LCD panel 32 has to be switched to the vertical displaying mode.

As the LCD panel 32 rotates counterclockwise gradually, the light blocking body 50 rotates around the rotation axis 48 accordingly and moves closer to the blocking position. When the LCD 32 rotates counterclockwise by 45 degrees, the first lateral side 44 of the light blocking body 50 coincides with the blocking position (the dashed line) and the light-sensing device 14 at this moment is switched from a first state capable of receiving light into a second state of receiving no light.

Figure 4:
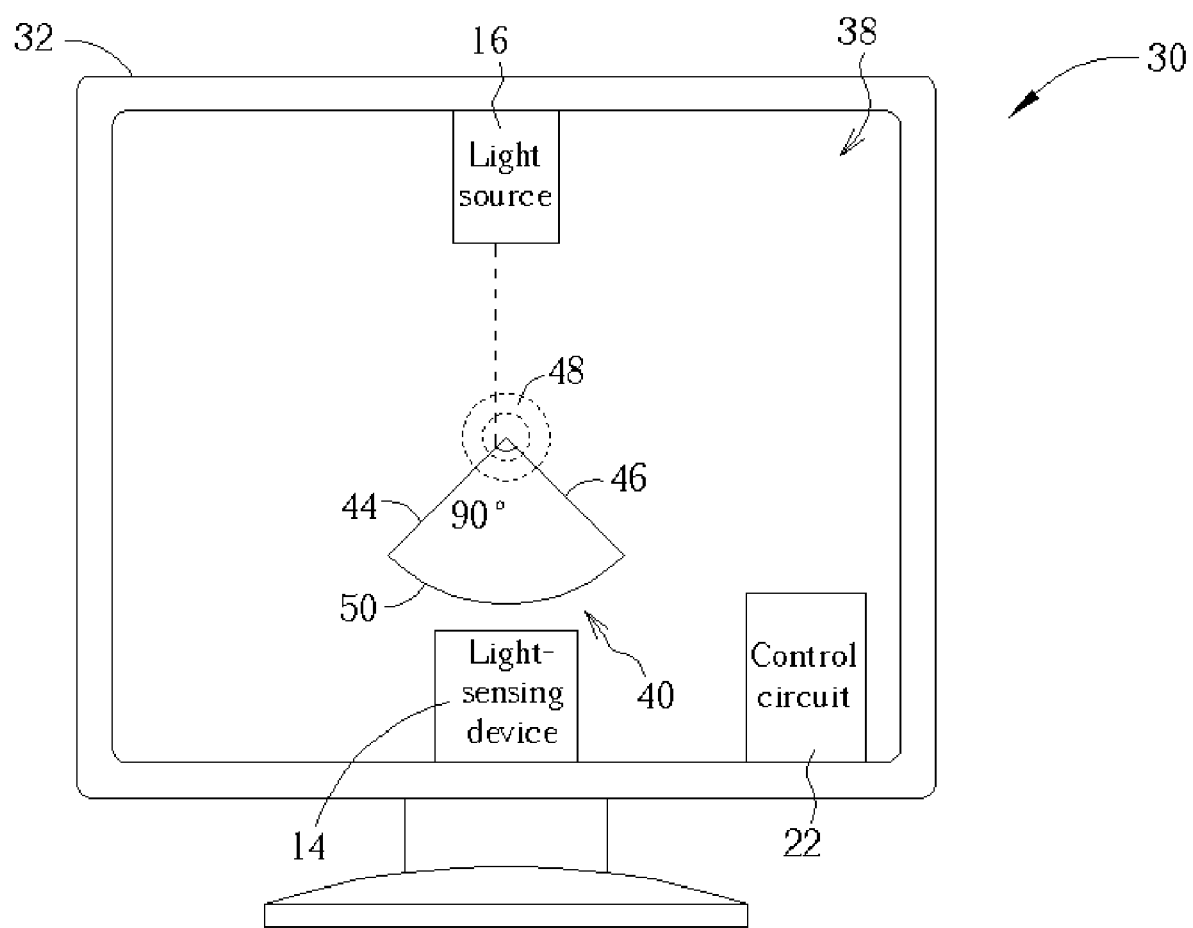
FIG. 4 is a front view of the electronic apparatus shown in FIG. 3 and turned counterclockwise for 90 degrees according to the present invention.

Please refer to FIG. 4, which is a front view of the electronic apparatus 30 when the LCD panel 32 is rotated counterclockwise by 90 degrees according to the present invention. Of the electronic apparatus 30 shown in FIG. 4, the light blocking body 50 of the light blocker 40 is located at the blocking position, and the light-sensing device 14 will not receive any light emitted by the light source 16. Thus the control circuit 22 then controls the LCD panel 32 accordingly. For example, the control circuit 22 controls the LCD panel 32 to operate in a horizontal displaying mode or reports to a host that the LCD panel 32 has to be switched to the horizontal displaying mode.

When the LCD panel 32 shown in FIG. 4 rotates clockwise by 90 degrees, which is greater than 45 degrees, the light blocking body 50 rotates away from the blocking position accordingly. In result, the light-sensing device 14 receives the light emitted by the light source 16 again, and the control circuit 22 then controls the LCD to operate in the vertical displaying mode accordingly.

Figure 5:
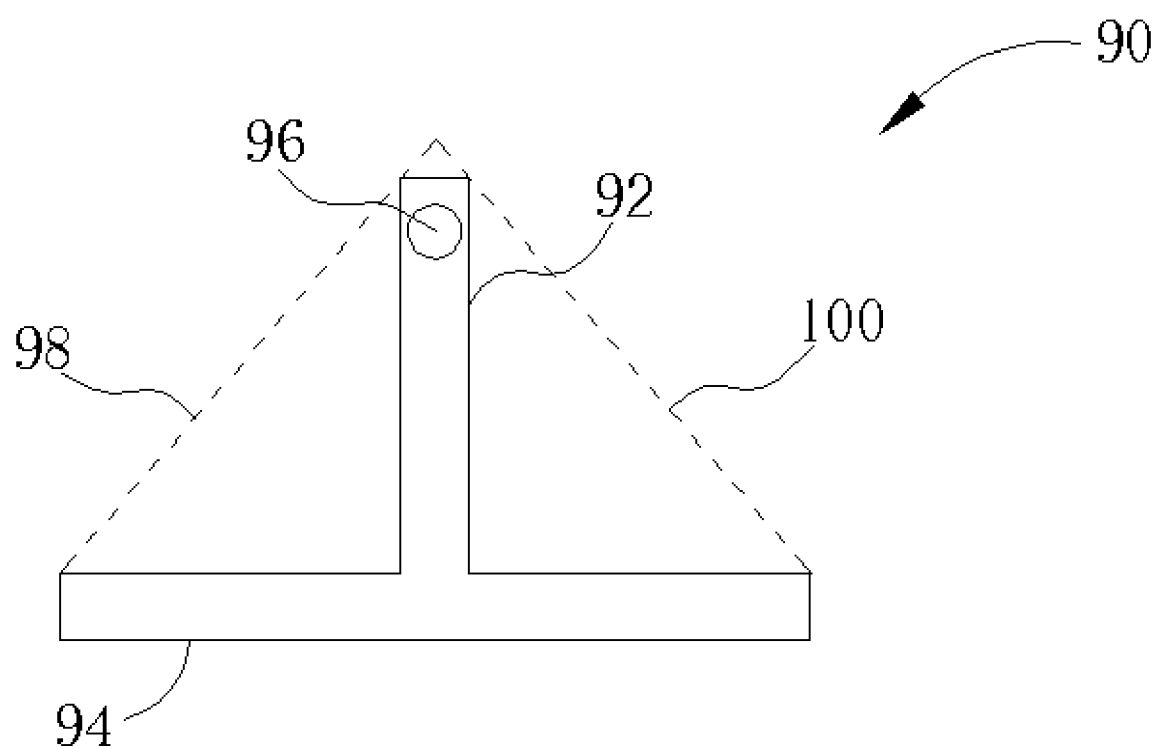
FIG. 5 is a side view of a light blocking body of the electronic apparatus of the second embodiment according to the present invention.

According to the second embodiment, the included angle between the first lateral side 44 and the second lateral side 46 measures 90 degrees. Of course, the included angle can measure any amount of degrees in addition to 90 degrees. Please refer to FIG. 5, which is a side view of another light blocking body 90 of the electronic apparatus 30 of the second embodiment according to the present invention. The light blocking body 90 has a shape different from that of the light blocking body 50. The light blocking body 90 comprises a rotation axis 96, a pole 92 and a lateral base 94 moving in accordance with the movement of the pole 92, and both of the pole 92 and the lateral base 94 rotating around the rotation axis 96. The pole 92 combines with the lateral base 94 to form two virtual lateral sides: a first virtual lateral side 98 and a second virtual lateral side 100. In practical use the light blocking body 90 has an efficacy similar to that of the light blocking body 50. Moreover, the lateral base 94 can have varied shape. For example, the lateral base 94 can have at least a hole installed to function like an optical grating for allowing light emitted by the light source to pass only when the electronic component is tilted at an angle within a predetermined range.

Figure 6:
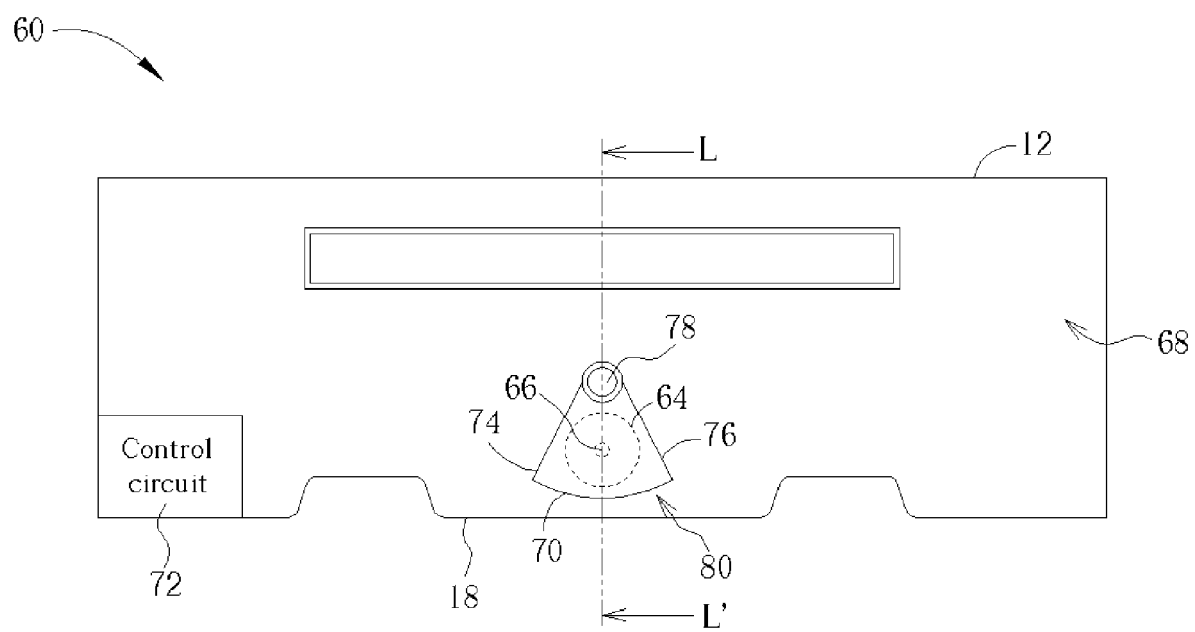
FIG. 6 is a front view of a flatly disposed electronic apparatus of a third embodiment according to the present invention.
Figure 7:
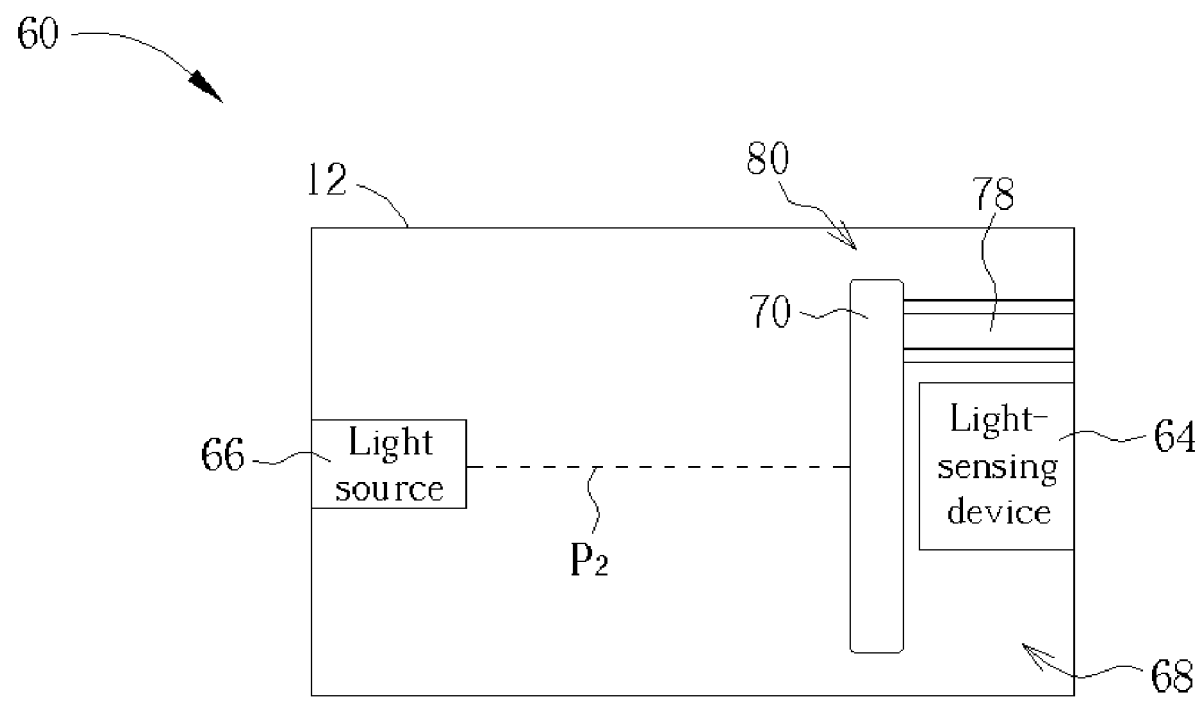
FIG. 7 is a cross-sectional diagram of the electronic apparatus shown in FIG. 6 along a line LL' according to the present invention.

Please refer to FIG. 6 and FIG. 7. FIG. 6 is a front view of an electronic apparatus 60 of a third embodiment according to the present invention. The electronic apparatus 60 also has the level-detecting function. FIG. 7 is a cross-sectional diagram of the electronic apparatus 60 along a line LL" according to the present invention. The electronic apparatus 60 comprises the optical disc drive 12, a light-sensing device 64, a light source 66, a housing 68, a light blocker 70 and a control circuit 72. The light blocker 70 comprises a rotation axis 78 rotatably fixed to the housing 68, and a light blocking body 80 fixed to the rotation axis 78 for rotating around the rotation axis 78 according to the rotation of the optical disc drive 12. The light blocking body 80 comprises a first lateral side 74 and a second lateral side 76. The first lateral side 74 and the second lateral side 76 have an included angle of 60 degrees.

The electronic apparatus 60 has an operation similar to that of the electronic apparatus 10 shown in FIG. 1. The operation of the electronic apparatus 60 is described as follows: When the optical disc drive 12 of the electronic apparatus 60 is flatly disposed, as shown in FIG. 6, the light blocking body 80 of the light blocker 70 is located at a blocking position. Thus the light blocking body 80 blocks light $P_2$ emitted by the light source 16 from projecting onto the light-sensing device 64, and the light-sensing device 64 therefore receives no light. The control circuit 22 then controls the optical disc drive 12 to operate on the enable mode and to read a disc continuously according to the light-sensing device 64 receiving no light. As the optical disc drive 12 of the electronic apparatus 12 is tilted gradually, the light blocking body 80 of the light blocker 70 rotates around the rotation axis 78 according to the rotation of the optical disc drive 12 and moves farther from the blocking position. As the optical disc drive 12 is tilted continuously and has a tilt angle equal to 30 degrees, the first lateral side 74 or the second lateral side 76 coincides with the line of emitted light $P_2$, depending on whether the optical disc drive 12 is rotated counterclockwise or clockwise. The light-sensing device 64 at this moment is switched from the second state of receiving no light into the first state capable of receiving light. As the optical disc drive 12 is tilted at an angle greater than 30 degrees, the light blocking body 80 moves away from the blocking position and the light-sensing device 64 receives the light emitted by the light source 66. In result, the control circuit 72 controls the optical disc drive 12 to operate in the off mode according to the light-sensing device 64 receiving the light emitted by the light source 66.

In addition to the electronic apparatuses 10, 30, and 60 mentioned above, the present invention further discloses a method for enabling an electronic apparatus to selectively operate in one of a plurality of operating modes according to a tilt angle of the electronic apparatus. The method controls an electronic component of the electronic apparatus to operate in one of the plurality of modes according to the intensity of light emitted by a light source and sensed by a light-sensing device. The method blocks the light emitted by the light source with a light blocker rotating according to the rotation of the electronic component and resulting in blocking light emitted by the light source as the electronic component is tilted at an angle within a predetermined range. According to the method, the electronic apparatus further comprises a housing for the light blocker to be rotatably fixed to. As the electronic component is tilted at an angle within the predetermined range, the light blocker rotates and moves to a blocking position where the light blocker will block light emitted by the light source. If the electronic component is an optical disc drive, the optical disc drive can be controlled to operate in an enable mode or an off mode according to the intensity of light received by the light-sensing device. If the electronic component is an LCD panel capable of operated selectively in a vertical displaying mode or a horizontal displaying mode, the LCD panel can be controlled to operate in the horizontal displaying mode or the vertical displaying mode according to the intensity of light received by the light-sensing device.

In contrast to the prior art, the present invention provides an electronic apparatus comprising an electronic component, a control circuit, a light source, a light-sensing device, and a light blocker. The control circuit controls the electronic component to operate in one of a plurality of modes according to the intensity of light received by the light-receiving device. For example, the control circuit controls the electronic component to operate in an off mode when the light-sensing device does not receive any light emitted by the light source so as to protect the electronic component from damage. If the electronic component is an optical disc drive, the control circuit can decide the tilted angle according to the intensity of light received by the light-receiving device. Furthermore, the control circuit can choose different auto-balancing algorithm or control the optical disc drive to operate in the off mode as previously mentioned.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus with level-detecting function, the electronic apparatus comprising:
   an optical disc drive;
   a light-sensing device for sensing light;
   a light source for emitting light onto the light-sensing device;
   a light blocker for blocking light emitted by the light source from projecting onto the light-sensing device when the optical disc drive is tilted and has a tilt angle within a predetermined range, wherein the light blocker is rotated around a rotating axis; and
   a control circuit electrically connected to the light-sensing device for controlling the optical disc drive to selectively operate in an enable mode or an off mode according to the intensity of light received by the light-sensing device, wherein the optical disc drive is in the off mode when the optical disc drive is tilted.

2. The electronic apparatus of claim 1 further comprising a housing for the light blocker to be rotatably fixed to, when the optical disc drive is tilted at an angle within the predetermined range, the light blocker is rotated to a position to block light emitted from the light source from projecting onto the light-sensing device.

3. The electronic apparatus of claim 1, wherein the optical disc drive continuously reads data stored on a disc when operating in the enable mode; but generates a sound signal or a light signal as an alarm signal, stops reading the data stored on the disc, or is turned off when operating in the off mode.

4. A method for enabling an optical disc drive to selectively operate in an enable mode and an off mode according to a tilt angle of the optical disc drive, the method comprising the following step:
   emitting light from a light source to a light-sensing device;
   blocking the light according to the tilt angle with a light blocker when the optical disc drive is tilted, wherein the light blocker is rotated around a rotating axis; and
   controlling the optical disc drive to operate in an enable mode or an off mode according to the intensity of light emitted by the light source and sensed by the light-sensing device, wherein the optical disc drive is in the off mode when the optical disc drive is tilted.

5. The method of claim 4, wherein the optical disc drive continuously reads data stored on a disc when operating in the enable mode; but generates a sound signal or a light signal as an alarm signal, stops reading the data stored on the disc, or is turned off when operating in the off mode.

6. The method of claim 4, wherein the optical disc drive further comprises a housing for the light blocker to be rotatably fixed to, when the optical disc drive is tilted at an angle within a predetermined range, the light blocker is rotated to a position to block light emitted by the light source from projecting onto the light-sensing device.

* * * * *